United States Patent

Reiber

[11] 4,045,530

[45] Aug. 30, 1977

[54] METHOD OF MANUFACTURING SHATTERPROOF COMBUSTION TYPE PHOTOFLASH LAMPS

[75] Inventor: Hans Reiber, Augsburg, Germany

[73] Assignee: Patent-Treuhand-Gesellschaft fur Elektrische Gluhlampen m.b.H., Germany

[21] Appl. No.: 729,733

[22] Filed: Oct. 5, 1976

[30] Foreign Application Priority Data

Oct. 16, 1975 Germany ............................ 2546403

[51] Int. Cl.[2] ............................................ B29C 17/04

[52] U.S. Cl. ............................ 264/92; 264/DIG. 71; 264/230; 29/25.13

[58] Field of Search .................... 29/25.11, 25.13, 477; 316/18, 19; 264/92, 230, DIG. 71; 156/86

[56] References Cited

U.S. PATENT DOCUMENTS

| | | | |
|---|---|---|---|
| 2,027,962 | 1/1936 | Currie | 264/230 |
| 3,442,987 | 5/1969 | Sentementes et al. | 29/447 X |
| 3,894,902 | 7/1975 | Hough et al. | 264/92 X |
| 3,902,946 | 9/1975 | Audesse et al. | 264/92 X |
| 3,962,766 | 6/1976 | Pompidor et al. | 29/447 X |

*Primary Examiner*—Richard B. Lazarus
*Attorney, Agent, or Firm*—W. D. Palmer

[57] ABSTRACT

Method for applying protective sleeves to combustion-type photoflash lamps wherein there is placed proximate a mold means a strip of organic plastic having a thickness of from about 0.3 to 0.8mm, a tough-plastic characteristic at a temperature of from about 160° to 200° C, a tough-elastic characteristic at a temperature of from about 90° to 125° C, and a freezing temperature of from about 65° to 70° C. The strip is heated to the tough-plastic temperature and drawn into the mold means to form a series of plastic cups which have a dimension slightly smaller than the lamps to be sleeved. When the temperature of the formed cups is in the tough-elastic range, they are expanded to be slightly larger than the lamps to be sleeved, and are then frozen. The lamps are then placed into the cups which are then heated to cause them to shrink-fit onto the lamps. The sleeved lamps are then severed from the residual plastic strip.

5 Claims, 3 Drawing Figures

METHOD OF MANUFACTURING SHATTERPROOF COMBUSTION TYPE PHOTOFLASH LAMPS

BACKGROUND OF THE INVENTION

The invention relates to a method of manufacturing combustion type photoflash lamps provided with a shatterproof sleeve of organic plastic material for integration into automated mass production of combustion type photoflash lamps. These combustion type photoflash lamps comprise a vitreous envelope which contains a filling of finely divided combustible material and a combustion-sustaining gas, more particularly oxygen. As is well known, the vitreous envelope shatters during the combustion process due to the pressure wave, and due to high thermal loading of the envelope. To inhibit scattering of fragments of shattered glass, the vitreous envelope of conventional lamps presently in use is covered with a tough lacquer coating which holds together the fragments of the shattered lamp envelope in its original shape.

While in case of the well-known combustion type photoflash lamps with a bulb volume of about 4 cubic centimeters and an oxygen pressure of from 1000 to 2000 torr, a coating prepared by one immersion into a lacquer bath affords sufficient protection from shattering, it is necessary in case of small size combustible photoflash lamps with a bulb volume of 1 cc and less and a respectively increased oxygen pressure of e.g. 5–15 atmospheres, to repeatedly immerse the bulbs in order to produce a reliable shatterproof coating. During the intervals between the individual working steps of immersion, the lacquer coating must be relieved from the solvent by drying.

The immersion procedure takes its time and, because of the use of inflammable solvents, it cannot be integrated into automated mass production. Moreover, it is expensive as the solvents cannot be recovered at a reasonable expenditure.

Another drawback of applying a shatterproof sleeve by lacquer coating is also mainly observed in case of small size lamp envelopes. For these applying a uniform coating with lacquer meets with difficulties. Shatterproof coatings of irregular thickness for these subminiature photoflash lamps can lead to so-called "exploders", i. e. the lamps blow up during the combustion process.

Another drawback of lacquer-coated subminiature type photoflash lamps is the formation of bubbles in the lacquer coating during combustion and the possible expansion of the coating. This enlargement of volume of the lacquer-coated photoflash lamp is liable to complicate the removal of flashed lamps, for instance, in flashguns incorporated in cameras or, to impair lamp transfer in multiflash devices.

To overcome these drawbacks, it has become known to place the vitreous envelope of a photoflash lamp in a shatterproof sleeve designed as a plastic capsule and matching the lamp shade.

The pre-shaped plastic capsule resembling a cap can be made from a heat-shrinking material which, subsequent to shrinking, closely abuts the envelope.

SUMMARY OF THE INVENTION

It is the aim of the present invention to integrate said modification of manufacture into the automated mass production of combustion type photoflash lamps. In accordance with the invention this is realized by providing a light-transmissive foil strip reeled off a supply reel of suitable width and having a thickness of about 0.3–0.8mm of a plastic material of tough-plastic characteristic within a temperature range A of from about 160°-200° C, of tough-elastic characteristic within a temperature range B of about 90°-125° C, and a freezing temperature $T_E$ of about 65° - 70° C in a predetermined time sequence, initially by hot-working (deep-drawing in vacuum) in temperature range A per manufacturing cycle with a plurality of regularly arranged cups which are matched to the lamp shape and almost equal the lamp dimensions. The shape of the cup is then enlarged by expansion in temperature range B to a dimension slightly exceeding the lamp dimensions. Subsequently the shape obtained by expansion is frozen by a reduction of temperature to below the freezing temperature $T_E$, whereupon combustion type photoflash lamps are placed in the "frozen" cups and the latter are heated again to such an extent as to be shrink-fitted onto the lamps. Finally, the finished lamps are severed from the foil strip.

For transfer of the foil strip which can be colorless or of blue color, imprinted transfer aids such as serrated teeth or perforations are used which can be shaped or punched along with manufacture of the cups. The arrangement of the cups shaped per manufacturing cycle can be selected such as to correspond to the arrangement of lamps in a multi-flash unit, for instance, a flashcube whereby lamp separation subsequent to the provision of the lamps with the shatterproof sleeve is omissible. Hot air or an IR emitter is used for reheating for the shrink-fitting process.

BRIEF DESCRIPTION OF THE DRAWINGS

The process according to the invention is described in detail by way of the accompanying drawings, wherein.

DESCRIPTION OF THE PREFERRED EMBODIMENTS

Figure 1:
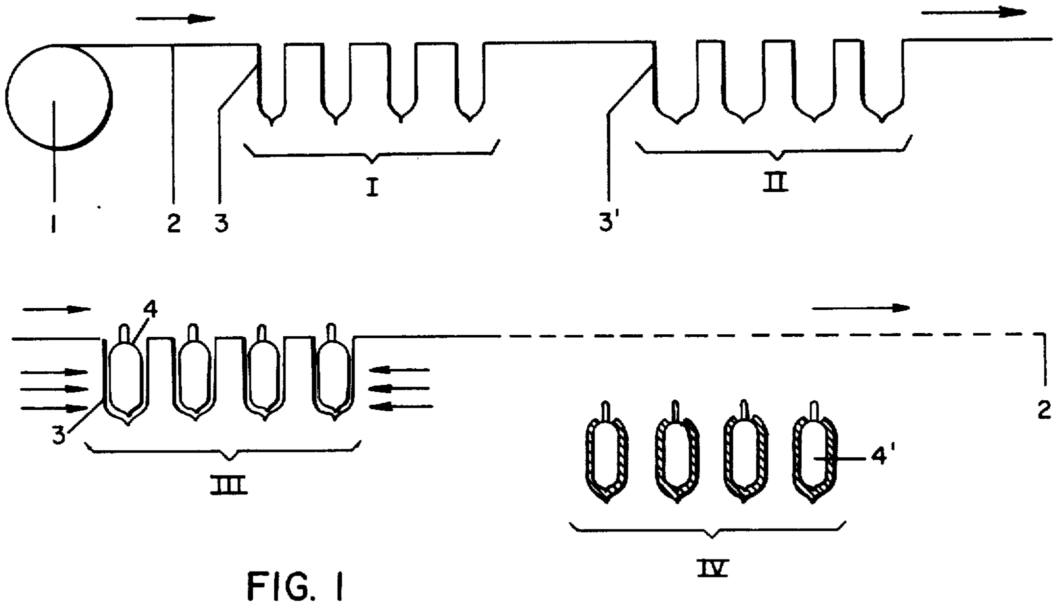
FIG. 1 schematically illustrates the course of procedure.
Figure 2:
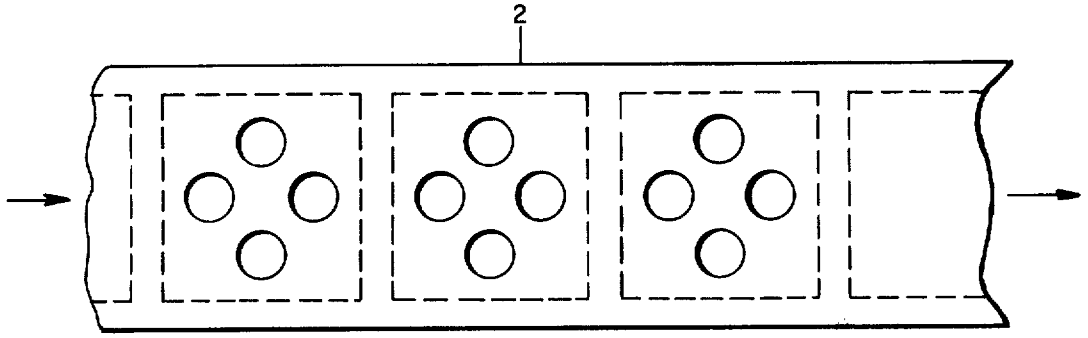
FIG. 2 shows a cutaway portion of a foil strip with cup arrangement for photoflash lamps intended for use in flashcubes.

A light-transmissive blue-colored foil strip 2 of organic plastic is reeled off a supply reel 1 (FIG. 1). The strip width is about 50 mm, its thickness which can range from about 0.3 - 0.8 mm is about 0.5 mm. The plastic material used is hard PVC. It is a calendered, unstretched and heat-treated PVC material. Within a temperature range A of about 160°-200° C it is of tough-plastic characteristic, and within a temperature range B of from about 90°- 124° C it is almost exclusively of tough-elastic characteristic. Its freezing temperature $T_E$ is from about 65°- 70° C. In a predetermined time sequence, the foil strip 2 is provided in a first stage by hot-working (deep-drawing-in vacuum) at a defined foil catchment area and utilizing a preparatory die and air, at a temperature of about 190° C per manufacturing cycle with a number of suitably regularly arranged cups 3 which are matched to the lamp shade but are of slightly smaller dimensions. Then, the cup shape is enlarged in a stage II by expansion of the cups 3 within temperature range B at about 95° C to a dimension slightly exceeding the lamp dimensions, and the shapes (cups 3'), thus obtained are "frozen" by reduction of temperature to below the freezing temperature $T_E$. After placing combustion type photoflash lamps 4 into the cups 3', the latter are reheated (to about 130° C) and are shrink-fitted in the course of this onto lamps 4 (stage III), whereupon the finished lamps 4' are severed from the foil strip 2. The arrangement of the cups per manufacturing cycle can be such as shown, for instance, in FIG. 2, when the lamps are intended for use with flashcubes. It is of course possible to provide more than four cups or to arrange them differently if this is suitable in one or the other case. Apart from PVC with a placisitizer content of up to 25% also other plastic materials can be used for the cups 3 such as, for instance, a copolymer of vinyl chloride and styrene as the foil.

Figure 3:
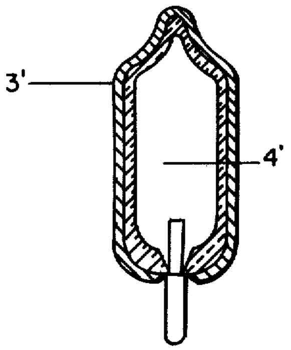
FIG. 3 shows a photoflash lamp manufactured in accordance with the invention.

A finished lamp 4', as shown in FIG. 3, is tightly enclosed in the shatterproof protective sleeve of plastic 3'. The lamp can be designed as an electrically or mechanically ignitable lamp. The electrically ignitable lamps can be of the low-ohmic or high-ohmic type.

I claim:

1. The method of applying light-transmitting organic plastic shatterproof sleeves to the exterior of combustion-type photoflash lamps, which method comprises:

a. placing proximate mold means having a configuration corresponding to but slightly smaller than the dimensions of the lamps to be sleeved, a strip of light-transmitting organic plastic having a thickness of from about 0.3mm to about 0.8mm, a tough-plastic characteristic within the temperature range A of from about 160° C to about 200° C, a tough-elastic characteristic within the temperature range B of from about 90° C to about 125° C, and a freezing temperature $T_E$ of from about 65° C to about 70° C; and heating said plastic strip to a temperature within said temperature range A and deep-drawing said heated organic plastic strip into said mold means to form organic plastic cups;

b. heating the formed organic plastic cups to a temperature within said temperature range B, and enlarging the heated organic plastic cups to a dimension slightly larger than the dimensions of the lamps to be sleeved, and freezing said enlarged organic plastic cups by reducing the temperature of said enlarged cups to less than said temperature $T_E$;

c. placing the lamps to be sleeved into said frozen cups;

d. heating said cups to cause same to shring-fit onto and sleeve said lamps; and e. severing said sleeved lamps from residual organic plastic strip.

2. The method as specified in claim 1, wherein said strip of organic plastic is fed from a supply reel to said mold means, and said deep-drawing into said mold means is by vacuum.

3. The method as specified in claim 2, wherein each of said steps is performed wthin a manufacturing cycle to facilitate automation.

4. The method as specified in claim 2, wherein said organic plastic strip is polyvinyl chloride having a thickness of about 0.5mm.

5. The method as specified in claim 2, wherein four of said lamps are simultaneously sleeved and are conformed as a flashcube unit.

* * * * *